Feb. 8, 1927. 1,616,983
H. J. O'BRIEN ET AL
BASKET
Filed Aug. 27, 1925
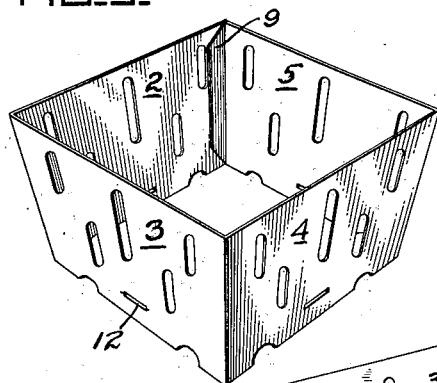
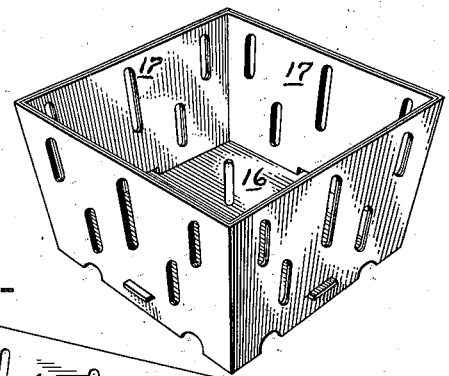
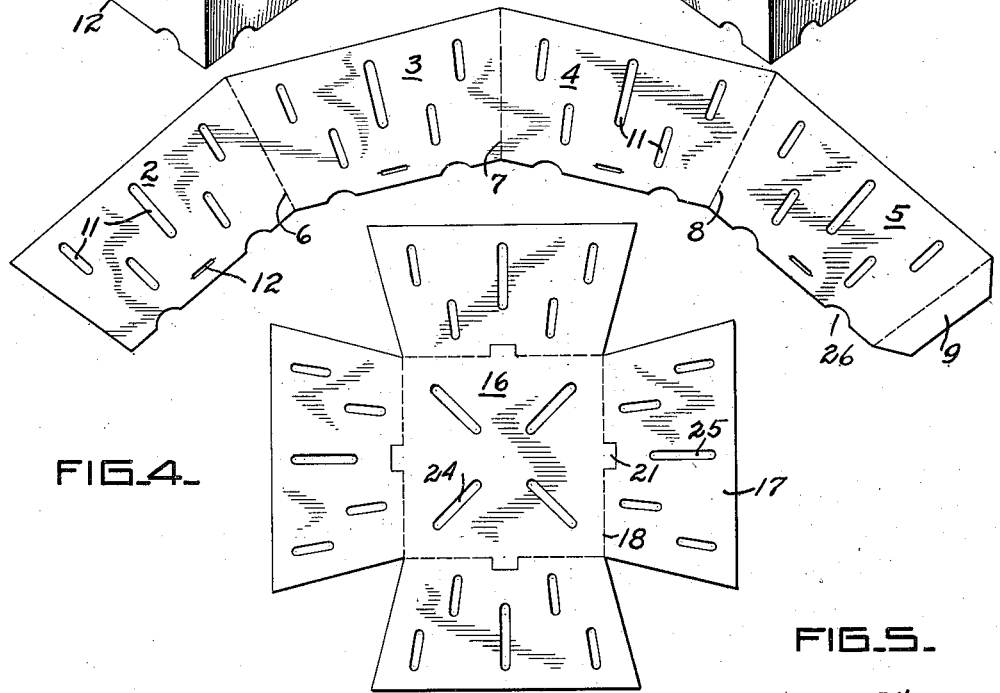
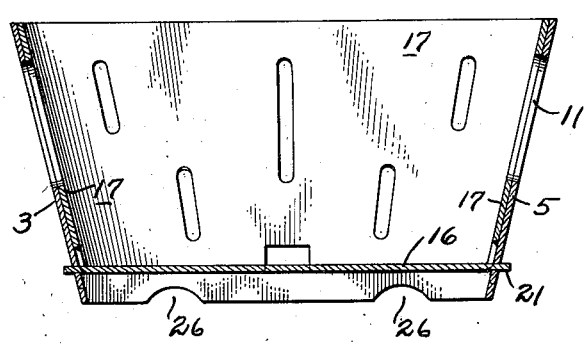
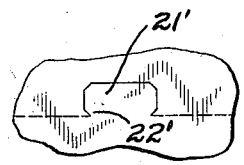
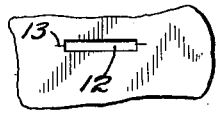
INVENTORS
Herbert J. O'Brien
BY Arthur Ralston Page
By Charles S. Evans
ATTORNEY.

Patented Feb. 8, 1927.

1,616,983

UNITED STATES PATENT OFFICE.

HERBERT J. O'BRIEN AND ARTHUR RALSTON PAGE, OF SAN FRANCISCO, CALIFORNIA; SAID PAGE ASSIGNOR TO SAID O'BRIEN.

BASKET.

Application filed August 27, 1925. Serial No. 52,730.

Our invention relates to an open container, and particularly to a basket in which fruit is packed for market.

One of the objects of our invention is the provision of a fruit basket which has no metal parts, such as staples or other fasteners, to bruise or discolor the fruit.

Another object of our invention is the provision of a basket which is impervious to moisture, and which cannot impart any foreign tastes or odors to the fruit.

A further object of our invention is the provision of a fruit basket which is formed from flat stock with a minimum of waste in cutting, which is packed and shipped in flat form, and which is easily and quickly assembled and held in assembled form by an automatic lock.

Our invention possesses other objects and features of advantage, some which, with the foregoing, will be set forth in the following description of our invention. It is to be understood that we do not limit ourselves to the showing made by said description, as we may adopt varient forms of our invention within the scope of the claim.

Referring to the drawings:—

Figure 1 is a perspective view of our fruit basket.

Fig. 2 is a vertical sectional view taken thru the center of our basket.

Fig. 3 is a perspective of the ring-like band or outer member of our basket when opened to receive the liner.

Figure 4 is a plan view of the sheet or blank comprising the liner of our fruit basket as it appears before folding.

Figure 5 is a fragmentary plan view of a part of the liner blank showing a modified form of the tab portion of the automatic lock of our basket.

Figure 6 is a fragmentary plan view of a part of the band member including the slot portion of the automatic lock used on our basket.

Figure 7 is a plan view of the sheet or blank comprising the outer member before the ends are adhesively united.

In terms of broad inclusion our invention is a fruit container which comprises two portions, both of which are preferably made of fibrous material such as paper board. A great deal of dissatisfaction has resulted from the use of the wooden basket commonly used in handling picked fruit. The wood is apt to impart a flavor to the fruit, and the metallic fasteners and reenforcing strips bruise and discolor the fruit which materially lessens its commercial value. The wooden basket does not provide sufficient ventilation, so that decay is hastened, and wood dampened with fruit juices provides a medium for the growth of mold and spores, which spread rapidly to the fruit.

The basket of our invention is made from a fibrous material such as paper board and is preferably formed in two parts, an outer portion and an inner portion. The outer portion forms the sides of the basket and comprises a ring-like band which has a smaller perimeter at the bottom than at the top, and which is provided with a plurality of ventilating apertures. Suitable notches are cut out of the lower edge of this band to permit air to circulate under the basket. The inner or liner portion comprises a bottom, the perimeter of which is greater than the perimeter of the lower edge of the band, so that the bottom is supported by the sides and does not contact with the surface upon which the basket rests. That portion of the sides extending below the bottom forms a flange-like leg of great strength about the entire lower end of the basket.

Disposed on each side of the bottom are tapered flaps which line the inner surface of the band above the bottom. Ventilating apertures are also provided in these flaps and when the liner is nested in the band, these apertures register with the apertures in the band so that unrestricted ventilation is insured. An automatic lock may be provided by striking tabs out of the flaps. These tabs are coplanar with the bottom, and extend thru slots in the band so that the bottom is not easily misplaced. The flaps are divided from the bottom by creases to facilitate the folding, and single movement in bringing the two parts of the basket together is sufficient to nest the liner in folded position within the band and lock the tabs in the slots.

The liner is preferably formed of a waterproof thin board, for example a chip board having asphalt incorporated therein, or a paraffined surface board. The outer ring member may be of light colored stock such as bleached manila news box board.

In detail our invention comprises a strip having four equal sections 2, 3, 4, and 5 separated by transversely extending creases 6, 7 and 8. The sides of the sections coincident with the sides of the strip are parallel, but the other opposite sides of each section, converge symmetrically, so that when the flap 9, which is formed at one edge of the strip, is adhesively united to the other end of the strip a tapered square ring such as shown in Figure 3 is formed, and this ring comprises the outer member of the basket. In the sides of this ring ventilating apertures 11 are provided which are preferably elongated slots so that a piece of fruit lying against the side of the basket is not apt to obstruct an aperture as would be likely if the openings were round. We have found it preferable to use fairly small apertures in the sides of the basket to avoid weakening the structure and reference to the drawings will disclose a size and arrangement of apertures which has proved very satisfactory. A slot 12 is also formed in the material adjacent the lower edge of each side of the ring-like member, and extending from the ends of this slot, are short slits 13.

The inner or liner member of the basket comprises a flat sheet blanked out as shown in Figure 4 and comprising a bottom 16 somewhat larger than the small opening in the ring. On each side of the bottom is a flap 17, divided therefrom by a crease or fold line 18, and which is exactly the same size as the inside surface of each of the sides of the ring member above the bottom, so that when the flaps are folded up the liner nests snugly in the ring member, the edges of the liner coming together in a tight joint in each corner. Since the ring member is tapered, and the flaps on the liner being similarly shaped, there is a wedge action which tends to tighten the joints when the basket is in use.

In order to provide means to prevent the liner from becoming disengaged from the ring, we may provide the modified form of locking tabs 21' preferably having a narrowed neck portion 22' and the outer corners removed as shown. These tabs are formed by suitable cutting tools when the blank is formed and are integral and coplanar with the bottom. Because of the peculiar shape of the tab, it readily enters the slot 12, and since the widest portion of the tab is somewhat greater than the length of the slot the corners between the end of the slot and the slit 13 are forced outwardly, and as the tab seats fully in the slot these corners snap back onto the neck portion of the tab and lock it in position.

The parts are so arranged and proportioned that the ring member and the liner may be thrust together with substantially a single motion, the flaps bending up as the liner is seated in the ring. As the tapered edges of the flaps seat against the sides of adjacent flaps the tabs snap into place in the slots and the assembling operation is completed.

It is entirely feasible to use a cheaper grade of material in the outer portion and a better grade of material in the liner, the two comprising together a basket having an attractive appearance and in which the same weight and thickness of material produces a stronger basket than can be produced by a single ply basket of the requisite weight of material. In previous baskets made of paper board there are from one to four thicknesses of material at various points in the basket. In our basket there are uniformly two thicknesses of material in the sides, each portion being cut with very little waste so that the basket can be made with the material costs substantially the same, or less than, other baskets, with the added advantage of presenting a superior stock to the fruit. That is to say, it is practically possible in the dual construction of the basket to use a waterproof liner of good quality in combination with a cheaper reenforcing or strengthening outer member, thus putting the good quality of material next to the fruit where it logically belongs.

The bottom 16 is provided with ventilating apertures 24, which may conveniently be spaced on the diagonals as shown. The flaps 17 are also provided with ventilating apertures 25, which register with the apertures 11 when the liner member and the ring member are assembled. In the lower edge of each side are formed two notches or recesses 26 so that air may circulate freely below the bottom 16, as well as thru the sides of the basket. The free circulation of air below and thru the basket is of great importance in delaying decay of the contents.

We claim:

A two piece basket comprising a bottomless ring-like member having outwardly tapered walls, said walls having cut-out portions adjacent their lower edges, a liner member comprising a bottom and sides nesting within the ring-like member, the sides of said liner being outwardly tapered to limit its downward movement relative to the ring-like member and tabs co-planar with the bottom of the liner engaging the cut-out portions of the side walls of the ring-like member and preventing upward movement of the liner.

In testimony whereof, we have hereunto set our hands.

HERBERT J. O'BRIEN.
ARTHUR RALSTON PAGE.